US011693111B2

(12) United States Patent
Uchida et al.

(10) Patent No.: US 11,693,111 B2
(45) Date of Patent: Jul. 4, 2023

(54) DISTANCE MEASUREMENT APPARATUS AND WINDSHIELD

(71) Applicant: Sony Corporation, Tokyo (JP)

(72) Inventors: Shigenori Uchida, Kanagawa (JP); Takahiro Takeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 337 days.

(21) Appl. No.: 15/733,888

(22) PCT Filed: May 8, 2019

(86) PCT No.: PCT/JP2019/018381
§ 371 (c)(1),
(2) Date: Dec. 1, 2020

(87) PCT Pub. No.: WO2020/008720
PCT Pub. Date: Jan. 9, 2020

(65) Prior Publication Data
US 2021/0215819 A1 Jul. 15, 2021

(30) Foreign Application Priority Data
Jul. 6, 2018 (JP) .................................. 2018-128662

(51) Int. Cl.
*G01S 13/931* (2020.01)
*B60J 1/00* (2006.01)
*H01Q 1/12* (2006.01)

(52) U.S. Cl.
CPC .............. *G01S 13/931* (2013.01); *B60J 1/001* (2013.01); *H01Q 1/1271* (2013.01); *G01S 2013/93276* (2020.01)

(58) Field of Classification Search
CPC ................ H01Q 1/1271; G01S 13/931; G01S 2013/93276; B60J 2/00
See application file for complete search history.

(56) References Cited

U.S. PATENT DOCUMENTS 3,599,214 A * 8/1971 Altmayer ............. H01Q 1/1271
343/803
4,992,801 A * 2/1991 Saito .................... H01Q 1/1271
343/850

(Continued)

FOREIGN PATENT DOCUMENTS

JP 52-146444 U 11/1977
JP 56-47591 Y2 11/1981

(Continued)

OTHER PUBLICATIONS

International Search Report and Written Opinion dated Jul. 16, 2019, received for PCT Application No. PCT/JP2019/018381, Filed on May 8, 2019, 13 pages including English Translation.

*Primary Examiner* — Peter M Bythrow
(74) *Attorney, Agent, or Firm* — Xsensus LLP (57) ABSTRACT

Radar loss caused by a windshield having laminated glass in a vehicle is suppressed with a simple configuration. An antenna's radiation section is disposed inside the windshield of a vehicle having a plurality of layers. The radiation section not only radiates radio waves but also receives reflected waves of the radio waves from a target. A distance measurement information generation section is connected to the radiation section. The distance measurement information generation section measures a distance to the target on the basis of the radiated radio waves and the reflected waves from the target and generates distance measurement information.

18 Claims, 9 Drawing Sheets

(56) References Cited

U.S. PATENT DOCUMENTS

| | | | | |
|---|---|---|---|---|
| 6,025,725 | A * | 2/2000 | Gershenfeld | H01F 17/0006 324/653 |
| 6,121,880 | A * | 9/2000 | Scott | G07C 5/085 340/572.5 |
| 6,211,831 | B1 * | 4/2001 | Nagy | H01Q 1/1271 343/700 MS |
| 6,275,157 | B1 * | 8/2001 | Mays | G07C 5/085 340/572.5 |
| 6,809,692 | B2 * | 10/2004 | Puente Baliarda | H01Q 1/38 343/711 |
| 6,879,281 | B2 * | 4/2005 | Gresham | G01S 13/106 342/134 |
| 7,511,675 | B2 * | 3/2009 | Puente-Baliarda | H01Q 1/3266 343/713 |
| 7,847,745 | B2 * | 12/2010 | Martin | B32B 17/10174 343/711 |
| 7,903,042 | B2 * | 3/2011 | Urban | H01Q 1/1271 343/797 |
| 7,973,734 | B2 * | 7/2011 | Strempel | H01Q 1/30 343/873 |
| 8,207,820 | B2 * | 6/2012 | Bauchot | H04Q 9/00 700/226 |
| 8,384,520 | B2 * | 2/2013 | Fourreau | G09F 3/203 701/14 |
| 8,810,462 | B2 * | 8/2014 | Goldberger | H01Q 1/1271 156/102 |
| 9,821,734 | B2 * | 11/2017 | McGuire, Jr. | H01Q 9/0407 |
| 9,837,707 | B2 * | 12/2017 | Villarroel | B32B 17/10376 |
| 10,373,731 | B1 * | 8/2019 | Wilson | H04B 10/25 |
| 10,396,428 | B2 * | 8/2019 | Daniel | H01Q 21/29 |
| 10,581,175 | B2 * | 3/2020 | Driscoll | H01Q 15/148 |
| 10,811,760 | B2 * | 10/2020 | Dai | H01Q 5/30 |
| 10,923,795 | B2 * | 2/2021 | Dai | H01Q 13/10 |
| 2002/0075138 | A1 * | 6/2002 | Van Rees | G01S 13/584 340/436 |
| 2003/0034927 | A1 * | 2/2003 | Deininger | H01Q 1/3291 343/713 |
| 2004/0227663 | A1 * | 11/2004 | Suzuki | G01S 13/931 342/72 |
| 2007/0241962 | A1 * | 10/2007 | Shinoda | H01Q 1/425 342/361 |
| 2008/0291097 | A1 * | 11/2008 | Fukushima | H01Q 1/1271 343/700 MS |
| 2010/0001897 | A1 * | 1/2010 | Lyman | G01S 17/86 701/93 |
| 2015/0102625 | A1 * | 4/2015 | Weicker | H01Q 1/3275 296/90 |
| 2015/0123838 | A1 * | 5/2015 | Shi | G01S 13/867 342/70 |
| 2016/0093944 | A1 * | 3/2016 | Kamo | H01Q 1/1271 348/148 |
| 2017/0207514 | A1 * | 7/2017 | Kamo | B32B 7/05 |
| 2017/0263999 | A1 * | 9/2017 | Miyoshi | H01Q 1/1271 |
| 2017/0274832 | A1 * | 9/2017 | Abe | B60R 1/04 |
| 2017/0324138 | A1 * | 11/2017 | Talty | H01Q 1/1271 |
| 2017/0324144 | A1 * | 11/2017 | Talty | H01Q 1/1271 |
| 2017/0331171 | A1 * | 11/2017 | Takahashi | H01Q 9/065 |
| 2019/0148821 | A1 * | 5/2019 | Talty | H01Q 1/48 343/713 |
| 2019/0280365 | A1 * | 9/2019 | Song | H01Q 1/1271 |
| 2019/0302254 | A1 * | 10/2019 | Maruyama | H01Q 21/065 |
| 2019/0322081 | A1 * | 10/2019 | Defoy | H05B 3/84 |
| 2019/0393613 | A1 * | 12/2019 | Kakuya | H01Q 9/045 |
| 2020/0158817 | A1 * | 5/2020 | Kambe | G01S 13/931 |

FOREIGN PATENT DOCUMENTS

| | | |
|---|---|---|
| JP | 2016-70916 A | 5/2016 |
| WO | 2018/001814 A1 | 1/2018 |
| WO | 2018/122926 A1 | 7/2018 |

* cited by examiner

DISTANCE MEASUREMENT APPARATUS AND WINDSHIELD

Cross-Reference to Related Applications

The present application is based on PCT filing PCT/JP2019/018381, filed May 8, 2019, which claims priority to JP 2018-128662, filed Jul. 6, 2018, the entire contents of each are incorporated herein by reference.

TECHNICAL FIELD

The present technology relates to a distance measurement apparatus and more particularly to a distance measurement apparatus for measuring a distance between a vehicle and a target by using radio waves having a given wavelength and to a windshield.

BACKGROUND ART

Three-layer laminated glass having glass stacked on a resin film layer is often chosen as a windshield of an automotive vehicle for passenger safety. Meanwhile, in the case where a passenger compartment is equipped with a radar to detect a target outside a vehicle, the radar suffers a loss due to passage through a glass surface included in the windshield. In order to suppress this loss, for example, a system for adjusting a radar incident angle has been proposed (refer, for example, to PTL 1).

CITATION LIST

Patent Literature

[PTL 1]
Japanese Patent Laid-open No. 2016-070916

SUMMARY

Technical Problem

In order to suppress a loss due to passage through laminated glass, the above conventional technology requires adjustment of an installation angle of a radar apparatus, installation of a reflection suppression structure, and the like, making the distance measurement apparatus complicated.

The present technology has been devised in light of the foregoing circumstances, and it is an object of the present technology to suppress radar loss caused by the windshield having laminated glass in a vehicle with a simple configuration.

Solution to Problem

The present technology has been made to solve the above problem, and a first aspect of the present technology is a distance measurement apparatus and a windshield thereof. The distance measurement apparatus includes a radiation section disposed inside a vehicle's windshield having a plurality of layers to radiate radio waves and receive reflected waves of the radio waves from a target and a distance measurement information generation section connected to the radiation section to measure a distance to the target on the basis of the radio waves and the reflected waves and generate distance measurement information. This provides an advantageous effect of suppressing loss caused by the windshield. It should be noted that the windshield may include laminated glass.

Also, in this first aspect, the distance measurement apparatus may further include a directing section disposed inside the windshield to guide the radio waves radiated from the radiation section, toward a given direction. This provides an advantageous effect of controlling a radio wave radiation direction via the windshield.

Also, in this first aspect, the distance measurement apparatus may further include a reflection section to reflect the radio waves radiated from the radiation section, toward the directing section. This provides an advantageous effect of ensuring improved radiation efficiency of radio waves via the windshield.

Also, in this first aspect, the distance measurement apparatus may further include a transmission/reception section connected to the radiation section to modulate the radio waves and demodulate the reflected waves. This provides an advantageous effect of modulating and demodulating radio waves. In this case, first wiring connecting the radiation section and the transmission/reception section is preferably shorter than second wiring connecting the transmission/reception section and a network of the vehicle. This provides an advantageous effect of reducing millimeter-wave loss.

Also, in this first aspect, the transmission/reception section may handle millimeter waves ranging from 1 to 10 millimeters as the radio waves and the reflected waves. This provides an advantageous effect of allowing useful application to millimeter waves that attenuate to a large extent.

Also, in this first aspect, the transmission/reception section may be disposed inside the windshield. This provides an advantageous effect of suppressing loss that takes place between the radiation section and the transmission/reception section.

Also, in this first aspect, the distance measurement apparatus may include a plurality of the radiation sections. This provides an advantageous effect of controlling radio wave directionality more elaborately.

Also, in this first aspect, the windshield may include a first glass layer, a second glass layer, and a resin layer sandwiched between the first and second glass layers, and the radiation section may be disposed between the first glass layer and the resin layer. This provides an advantageous effect of embedding the radiation section in the laminated glass.

Also, in this first aspect, the distance measurement apparatus may further include a directing section disposed between the second glass layer and the resin layer to guide the radio waves radiated from the radiation section, toward a given direction. This provides an advantageous effect of controlling a radio wave radiation direction via the windshield including laminated glass.

Also, in this first aspect, the distance measurement apparatus may further include a transmission/reception section disposed between the first glass layer and the resin layer and connected to the radiation section to modulate the radio waves and demodulate the reflected waves. This provides an advantageous effect of embedding the radiation section and the transmission/reception section in the same layer and suppressing loss that takes place between the radiation section and the transmission/reception section.

Also, in this first aspect, the resin layer may include polyvinyl butyral.

Also, in this first aspect, the windshield may be disposed at least on a front side, a lateral side, or a rear side of the vehicle. This provides an advantageous effect of suppressing loss in the windshield in a desired direction.

Advantageous Effect of Invention

According to the present technology, it is possible to achieve an excellent advantageous effect of suppressing, with a simple configuration, radar loss caused by a windshield including laminated glass in a vehicle. It should be noted that the advantageous effect described here is not necessarily limitative and may be any one of the advantageous effects described in the present disclosure.

DESCRIPTION OF EMBODIMENTS

Modes for carrying out the present technology (hereinafter referred to as embodiments) will be described below. The description will be given in the following order.
1. First embodiment (example in which a millimeter-wave antenna is embedded in the windshield)
2. Second embodiment (example in which a millimeter-wave chip is further embedded in the windshield)
3. Third embodiment (example in which a plurality of millimeter-wave antennas is embedded in the windshield)

1. First Embodiment

Figure 1:
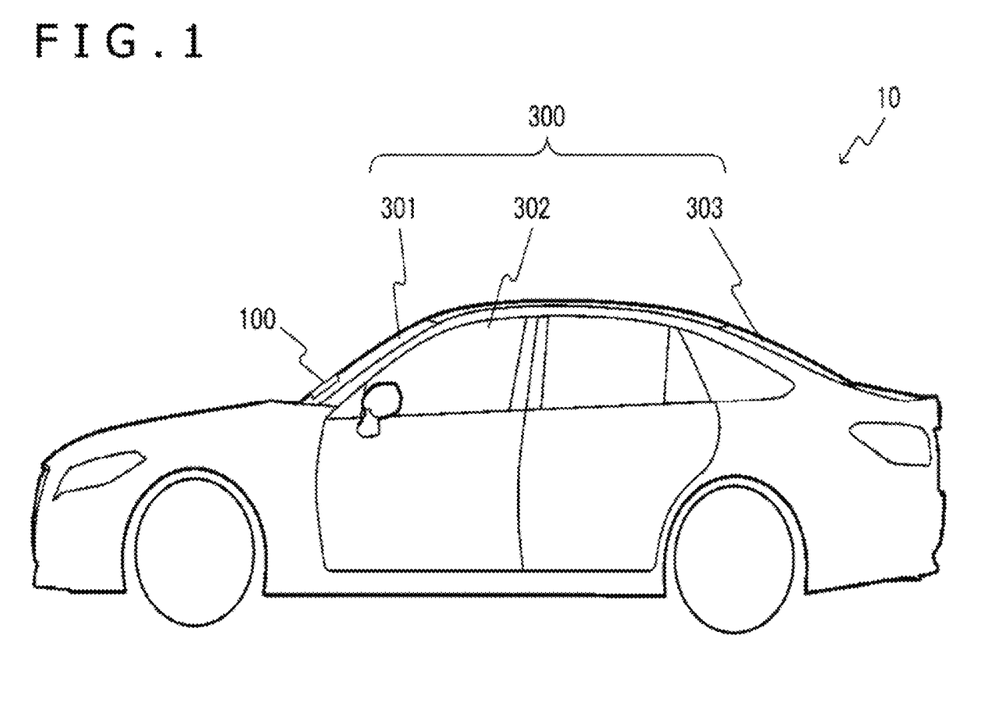
FIG. 1 is a diagram illustrating an example of an external side view of an automotive vehicle 10 in an embodiment of the present technology.

[Windshield]
FIG. 1 is a diagram illustrating an example of an external side view of an automotive vehicle 10 in an embodiment of the present technology.

The vehicle 10 includes a transparent or translucent windshield 300 to allow visibility into the vehicle from outside. The windshield 300 on the front side in a direction of travel is referred to as a front windshield 301. The windshield 300 on a lateral side is referred to as a side windshield 302. The windshield 300 on the rear side is referred to as a rear windshield 303.

The windshield 300 often includes laminated glass. In the present embodiment, we assume that part of an antenna 100 is embedded in the front windshield 301 by taking advantage of this laminated glass structure.

The antenna 100 is designed to achieve transmission and reception of radio waves by a millimeter-wave radar. The millimeter-wave radar (Radio Detection And Ranging) detects an object by radiating radio waves ranging from 1 to 10 millimeters in wavelength (millimeter-wave) and measuring reflected waves thereof.

Millimeter waves used by this millimeter-wave radar are shorter in wavelength than radio waves used in television broadcasting, ETC (Electronic Toll Collection system), and the like, making these waves prone to significant attenuation in the windshield 300. Accordingly, the present embodiment is particularly useful in a case of being applied to millimeter waves shorter in wavelength than radio waves in other frequency bands with longer wavelengths.

It should be noted that, although an example of the front windshield 301 having at least part of the antenna 100 embedded therein will be described in the present embodiment, the antenna 100 may be embedded in the side windshield 302 or the rear windshield 303 according to the purpose of use. It should be noted, however, that, in that case, the windshield 300 needs to include laminated glass.

Figure 2:
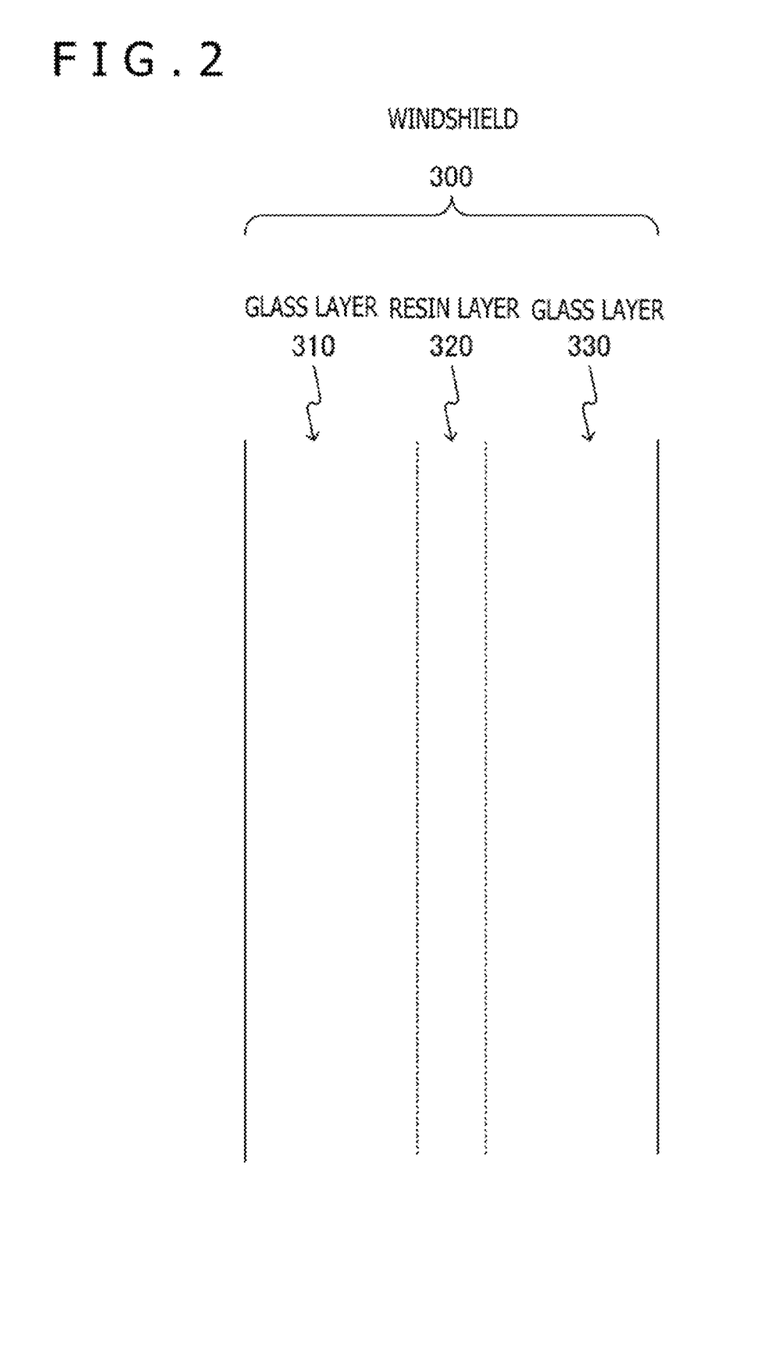
FIG. 2 is a diagram illustrating an example of a cross section of a windshield 300 in the embodiment of the present technology.

FIG. 2 is a diagram illustrating an example of a cross section of the windshield 300 in the embodiment of the present technology.

The windshield 300 includes laminated glass having a resin layer 320 sandwiched between glass layers 310 and 330. The glass layers 310 and 330 include, for example, soda lime glass. The resin layer 320 includes, for example, a polyvinyl butyral (PVB) film.

The glass layer 310 is an example of the first glass layer recited in the claims. Also, the glass layer 330 is an example of the second glass layer recited in the claims.

It should be noted that, although an example of laminated glass including three layers has been given, the laminated glass may further include another layer.

Also, the windshield 300 in the present embodiment need not include glass as long as a plurality of layers is provided. For example, the windshield 300 may include resin such as polycarbonate.

Figure 3:
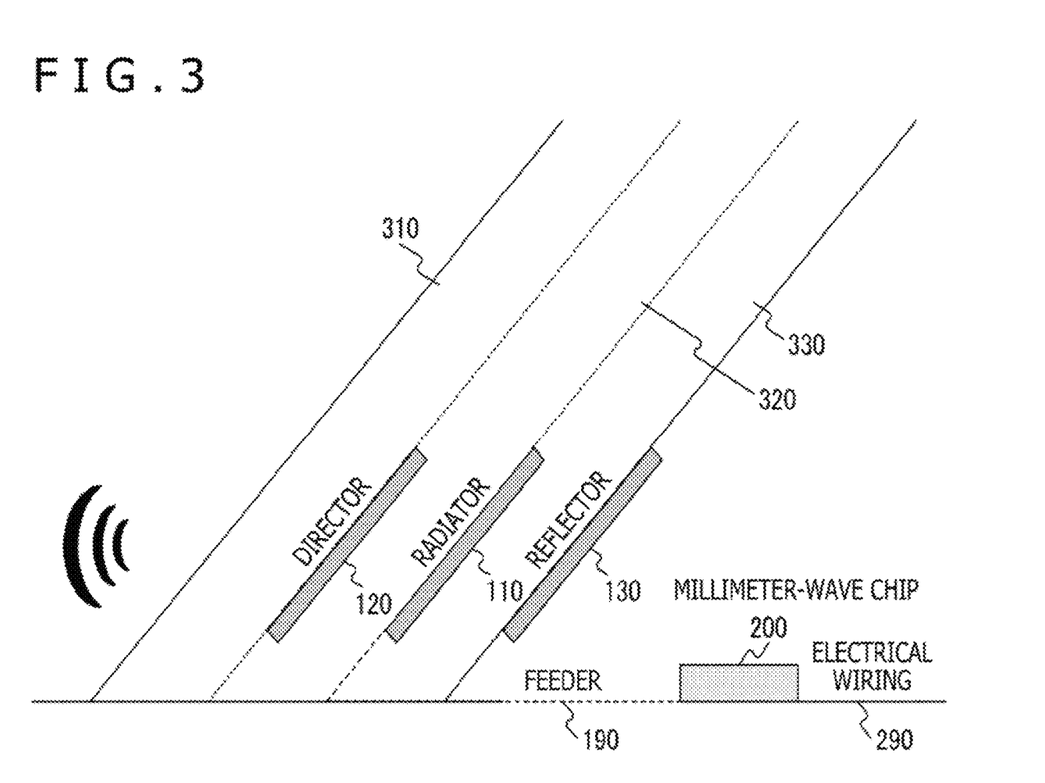
FIG. 3 is a diagram illustrating an example of installation of an antenna 100 to the windshield 300 in a first embodiment of the present technology.

[Antenna]
FIG. 3 is a diagram illustrating an example of installation of the antenna 100 to the windshield 300 in a first embodiment of the present technology.

In this example, the antenna 100 includes a radiator 110, a director 120, and a reflector 130.

The radiator 110 not only radiates radio waves but also receives reflected waves of the radio waves from a target. The radiator 110 is disposed between the glass layer 330 and the resin layer 320. It should be noted that the radiator 110 is an example of the reflection section recited in the claims.

The director 120 guides radio waves radiated from the radiator 110, toward a given direction. The radio waves radiated from the radiator 110 are radiated vertically relative to the radiator 110 if left as they are. Accordingly, in the case where the antenna 100 is embedded in the front windshield 301, radio waves are radiated at an upward elevation angle. By using the director 120, it is possible to control radiation of the radio waves such that they are radiated horizontally. The director 120 is disposed between the glass layer 310 and the resin layer 320. It should be noted that the director 120 is an example of the directing section recited in the claims.

The reflector 130 reflects the radio waves radiated from the radiator 110, toward the director 120. This allows radio waves not required to be radiated into the passenger compartment to be reflected forward, thus providing improved radiation efficiency of radio waves. The reflector 130 is disposed inside or in contact with the glass layer 330. It should be noted that the reflector 130 is an example of the reflection section recited in the claims.

In the antennas 100, a feeder 190 is connected to the radiator 110, causing the radiator 110 to be connected to a millimeter-wave chip 200 via the feeder 190.

The millimeter-wave chip 200 is a semiconductor chip designed to transmit and receive radio waves of a millimeter-wave radar. The millimeter-wave chip 200 includes, for example, a CMOS (Complementary Metal-Oxide-Semiconductor) IC (Integrated Circuit). This allows for downsizing of a millimeter-wave radar, thus achieving a reduced BOM (Bill of Material). It should be noted that the millimeter-wave chip 200 is an example of the transmission/reception section recited in the claims.

The millimeter-wave chip 200 is installed in any area of the vehicle 10. The millimeter-wave chip 200 connects to the radiator 110 via the feeder 190 and to a vehicle-mounted network described later via electrical wiring 290. The millimeter-wave chip 200 supplies a signal corresponding to a difference between the transmitted radio waves and the received radio waves to the electrical wiring 290 as a few MHz baseband signal. The electrical wiring 290 is also used for supply power. Loss is smaller in the electrical wiring 290 than in the feeder 190 that handles millimeter waves. Accordingly, the shorter the feeder 190, the more desirable, and in the case where routing is required in the vehicle 10, it is desirable to use a portion of the electrical wiring 290.

In the case where the antenna 100 is installed in a lower area of the front windshield 301, for example, as illustrated in FIG. 1, the millimeter-wave chip 200 is desirably installed inside a dashboard of the vehicle 10. This configuration enables shortening of the feeder 190, permitting easy maintenance on the millimeter-wave chip 200 in the event of a defect in the millimeter-wave chip 200.

Also, in the case where the antenna 100 is installed in an upper area of the front windshield 301, the millimeter-wave chip 200 is desirably installed inside a roof or an overhead console of the vehicle 10. This configuration allows for distance measurement from an elevated position and further enables shortening of the feeder 190, permitting easy maintenance on the millimeter-wave chip 200 in the event of a defect in the millimeter-wave chip 200.

Also, in the case where the antenna 100 is installed in an upper area of the front windshield 301, the antenna 100 is desirably installed near a rear-view mirror. This configuration allows for disposition of the antenna 100 in a manner not obstructing driver's vision.

Also, the antenna 100 is desirably disposed where it is wiped by a wiper in the front windshield 301. This configuration mitigates adverse impact on radio waves in a case where raindrops are on the antenna 100.

[Millimeter-Wave Chip]

Figure 4:
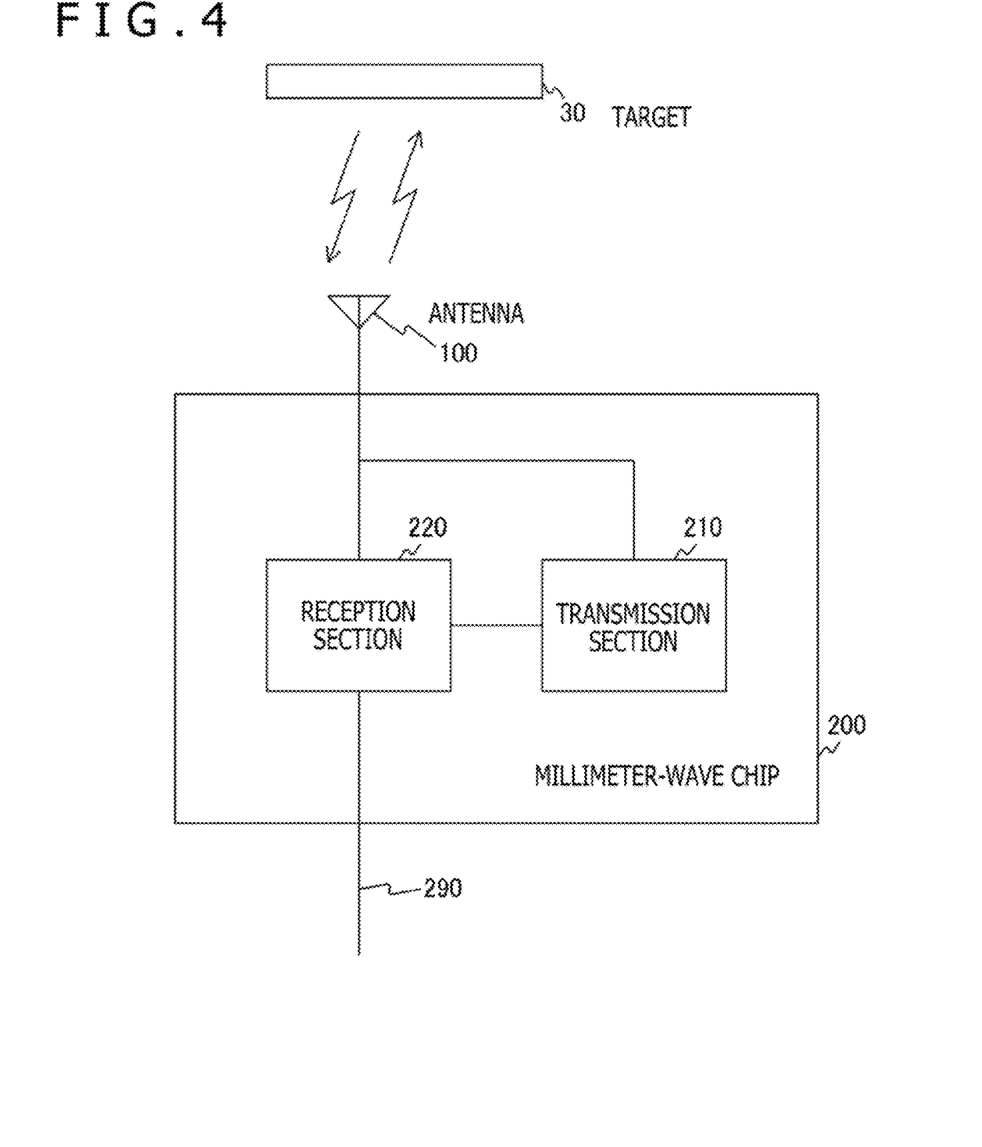
FIG. 4 is a diagram illustrating a configuration example of a millimeter-wave chip 200 in the embodiment of the present technology.

FIG. 4 is a diagram illustrating a configuration example of the millimeter-wave chip 200 in the embodiment of the present technology. The millimeter-wave chip 200 includes a transmission section 210 and a reception section 220.

The transmission section 210 is a high-frequency circuit (RF frontend) that modulates a baseband signal and transmits millimeter waves to a target. Millimeter waves transmitted from the transmission section 210 are chirp waves that vary in frequency with time.

The reception section 220 is a high-frequency circuit that receives millimeter waves (reflected waves) reflected from a target. The reception section 220 demodulates received millimeter waves into a baseband signal and supplies the signal to the electrical wiring 290.

[Vehicle-Mounted System]

Figure 5:
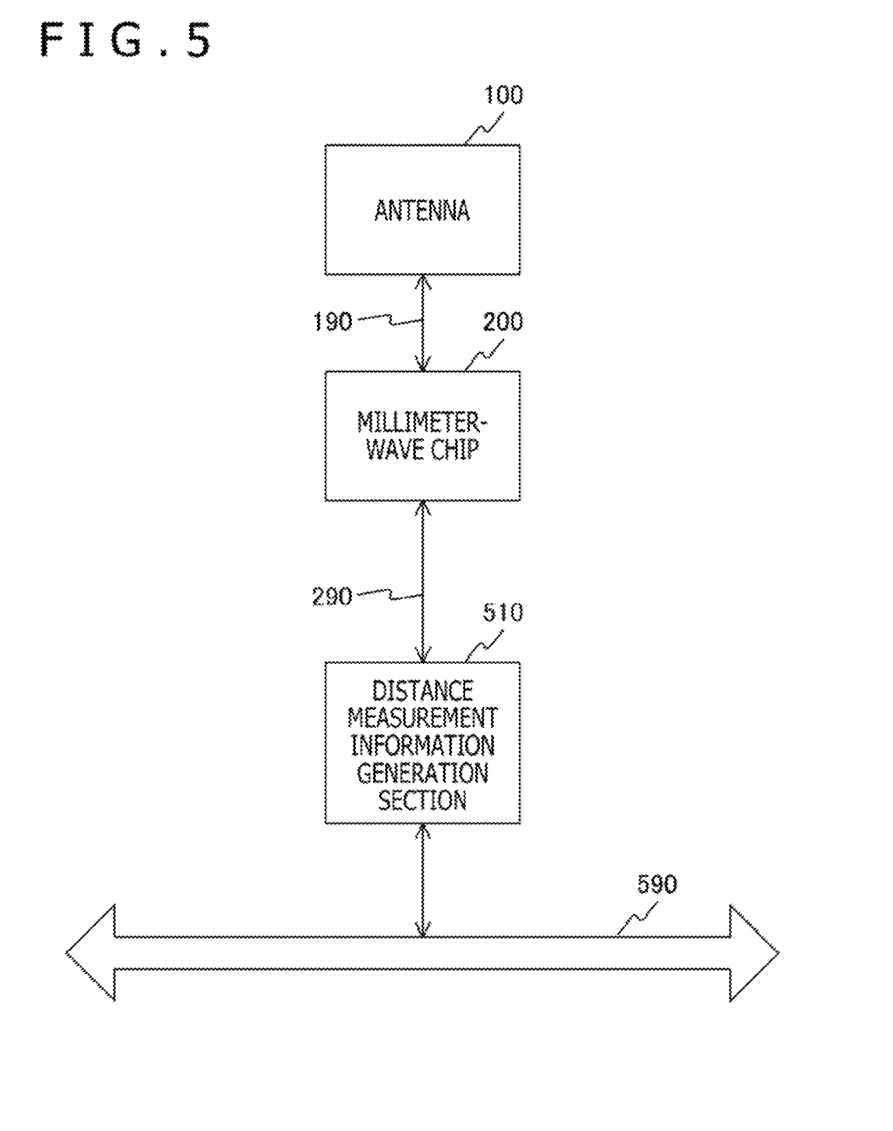
FIG. 5 is a diagram illustrating a configuration example of part of a vehicle-mounted system of the vehicle 10 in the first embodiment of the present technology.

FIG. 5 is a diagram illustrating a configuration example of part of a vehicle-mounted system of the vehicle 10 in the first embodiment of the present technology.

In the vehicle-mounted system of the vehicle 10, at least part of the antenna 100 is embedded in the windshield 300 and connected to the millimeter-wave chip 200 via the feeder 190 as described above.

The electrical wiring 290 from the millimeter-wave chip 200 is connected to a vehicle-mounted network 590 via a distance measurement information generation section 510. A vehicle-mounted communication network conforming to any standard such as CAN (Controller Area Network), LIN (Local Interconnect Network), LAN (Local Area Network), or FlexRay (registered trademark) can be used as the vehicle-mounted network 590.

A variety of control units are connected to the vehicle-mounted network 590. We assume that the distance measurement information generation section 510 that measures the distance to a target on the basis of a signal obtained by the millimeter-wave chip 200 (a signal corresponding to the difference between the transmitted radio waves and the received reflected waves) and generates distance measurement information is used as one of such control units.

The distance measurement information generation section 510 includes an FFT (Fast Fourier Transform) section, detecting a beat frequency that occurs as a result of addition of a reflected wave and an original chirp wave through Fast Fourier Transform using this FFT section and calculating the distance to the target and the like.

It should be noted that this vehicle-mounted system may handle a target detection process, a tracking process, and the like on the basis of a signal obtained through Fast Fourier Transform. Further, the vehicle-mounted system may generate a vehicle control signal regarding an ADAS (Advanced Driving Assistance System) on the basis of the result of the target detection process or the tracking process.

First Modification Example

Figure 6:
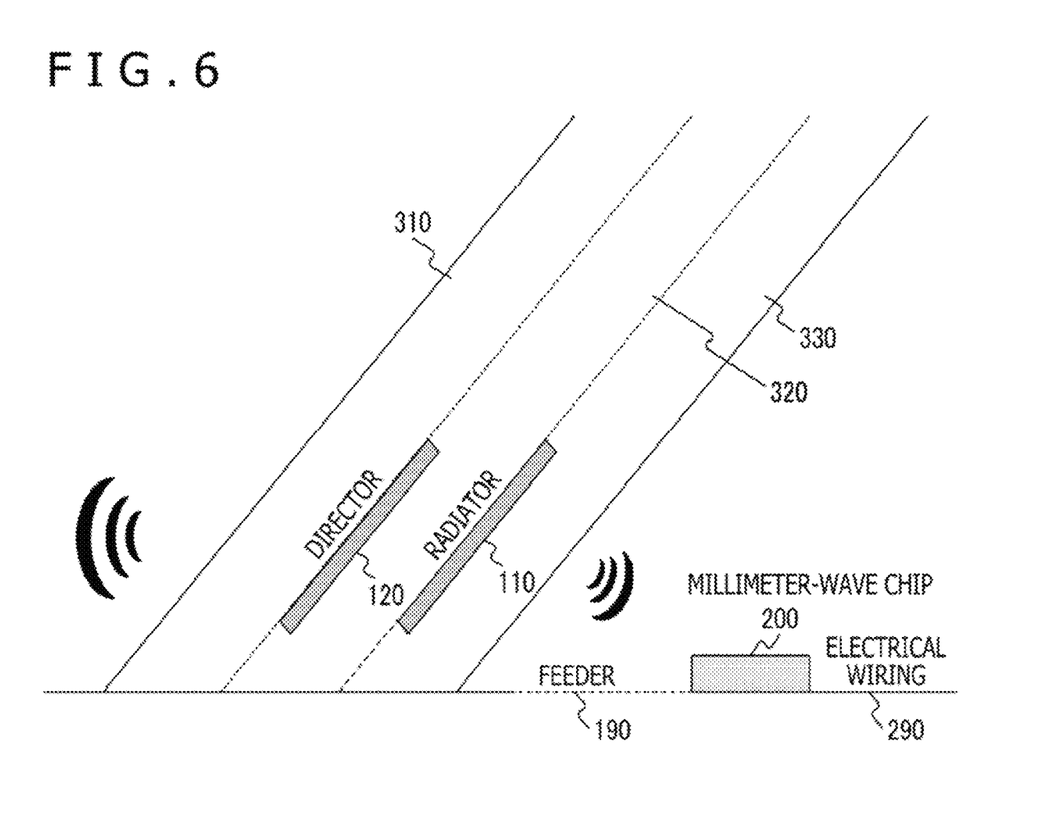
FIG. 6 is a diagram illustrating an example of installation of the antenna 100 to the windshield 300 in a first modification example of the first embodiment of the present technology.

FIG. 6 is a diagram illustrating an example of installation of the antenna 100 to the windshield 300 in a first modification example of the first embodiment of the present technology.

Although it has been assumed, in the above first embodiment, that the radiator 110, the director 120, and the reflector 130 are used as the antenna 100, the reflector 130 is omitted in this first modification example. This provides a simpler structure of the antenna 100 albeit with lower radiation efficiency of radio waves.

Second Modification Example

Figure 7:
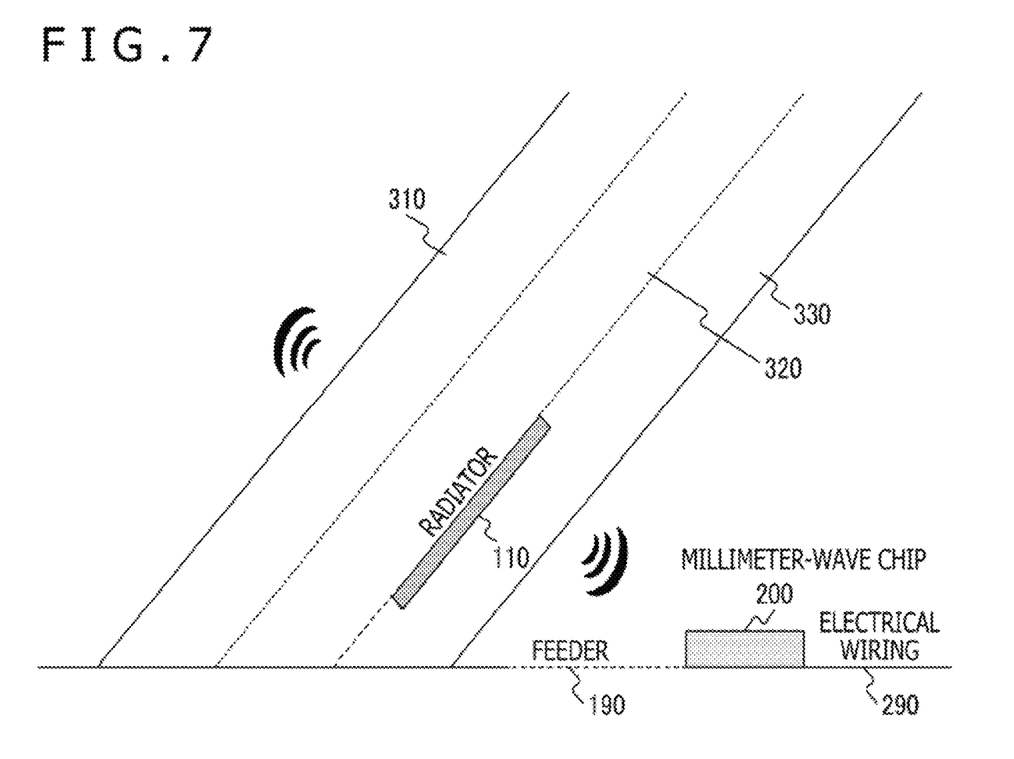
FIG. 7 is a diagram illustrating an example of installation of the antenna 100 to the windshield 300 in a second modification example of the first embodiment of the present technology.

FIG. 7 is a diagram illustrating an example of installation of the antenna 100 to the windshield 300 in a second modification example of the first embodiment of the present technology.

Although it has been assumed, in the above first embodiment, that the radiator 110, the director 120, and the reflector 130 are used as the antenna 100, the director 120 and the reflector 130 are omitted in this second modification example. This provides a simpler structure of the antenna 100 although the antenna 100 is no longer able to control radio wave directivity.

As described above, according to the first embodiment of the present technology, it is possible to reduce a passage distance in the windshield 300 by embedding at least part of the antenna 100 in the windshield 300, thus suppressing loss of radio waves. Further, the millimeter-wave chip 200 can be installed externally to the windshield 300, thus permitting maintenance on the millimeter-wave chip 200 in the event of a defect in the millimeter-wave chip 200 without replacing the whole windshield 300.

2. Second Embodiment

In the above first embodiment, it has been assumed that the millimeter-wave chip 200 is installed in any area of the vehicle 10. In this case, it is necessary to connect the millimeter-wave chip 200 and the radiator 110 embedded in the windshield 300, via the feeder 190, possibly resulting in loss. In this second embodiment, the millimeter-wave chip 200 is further embedded in the windshield 300, thus suppressing loss taking place between the millimeter-wave chip 200 and the radiator 110.

Figure 8:
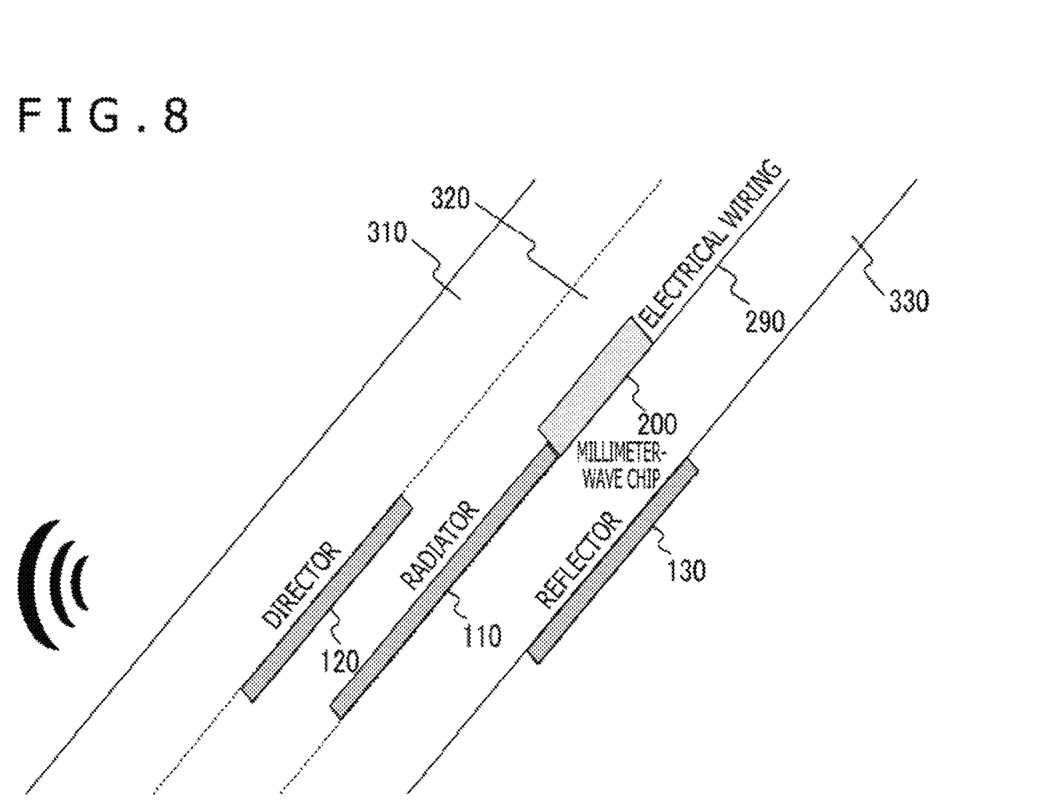
FIG. 8 is a diagram illustrating an example of installation of the antenna 100 and a millimeter-wave chip 200 to the windshield 300 in a second embodiment of the present technology.

FIG. 8 is a diagram illustrating an example of installation of the antenna 100 and the millimeter-wave chip 200 to the windshield 300 in the second embodiment of the present technology.

In this second embodiment, the millimeter-wave chip 200 is further embedded in the windshield 300 in addition to the antenna 100 of the above first embodiment. At this time, the millimeter-wave chip 200 is desirably embedded in the same layer as the radiator 110. This ensures minimum connection between the radiator 110 and the millimeter-wave chip 200, thus suppressing loss taking place therebetween.

Also, as a result thereof, part of the electrical wiring 290 to be connected to the millimeter-wave chip 200 is also embedded in the windshield 300. That is, the electrical wiring 290 extending from the windshield 300 is connected to the vehicle-mounted network 590.

It should be noted that the first or second modification example of the above first embodiment is applicable to the antenna 100 of the second embodiment.

As described above, according to the second embodiment of the present technology, it is possible to suppress loss taking place between the radiator 110 and the millimeter-wave chip 200 by further embedding the millimeter-wave chip 200 in the windshield 300, thus ensuring further improved radiation efficiency of radio waves.

3. Third Embodiment

Although examples of transmission and reception of radio waves using the single antenna 100 are described in the above first and second embodiments, the number of antennas is not limited to one, and two or more antennas may be used.

Figure 9:
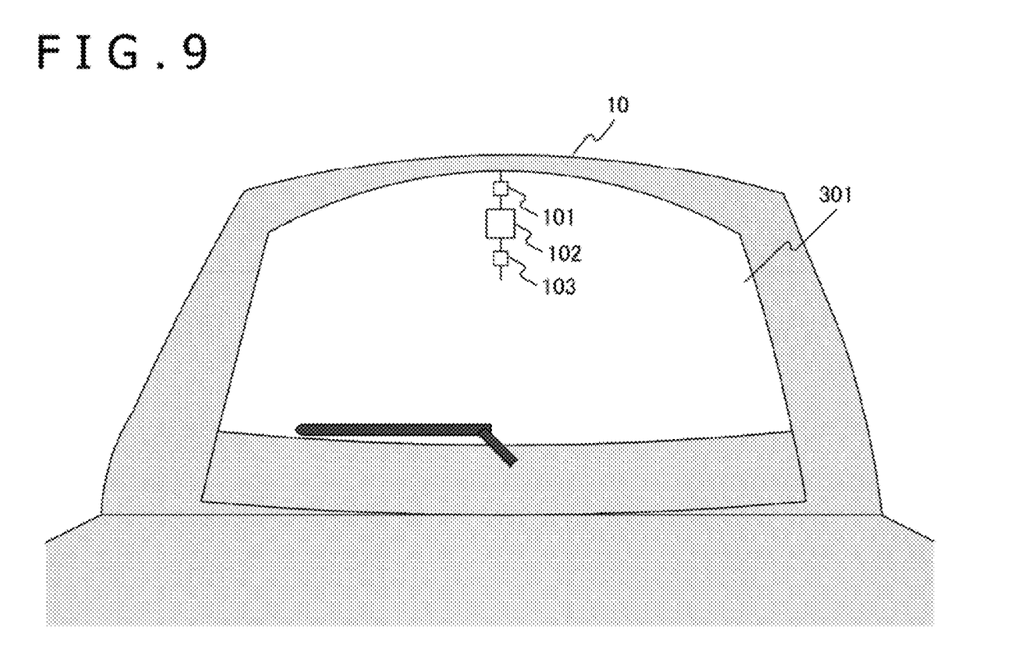
FIG. 9 is a diagram illustrating an example of installation of antennas 101 to 103 in a third embodiment of the present technology.

FIG. 9 is a diagram illustrating an example of installation of antennas 101 to 103 in a third embodiment of the present technology.

In the third embodiment, we assume that three antennas or the antennas 101 to 103 are embedded in the front windshield 301. Each of the antennas 101 to 103 includes at least a radiator as do the antennas 100 of the first and second embodiments. Also, each of the antennas 101 to 103 may further include, as necessary, a director, and further, a reflector.

By appropriately disposing the plurality of antennas 101 to 103, it is possible to control radio wave directionality more elaborately. For example, it is possible to provide directionality by using a plurality of patch antennas in combination, thus ensuring a substantially longer communication distance.

It should be noted that the first or second modification example of the above first embodiment is applicable to the antennas 101 to 103 of the third embodiment. Also, although an example of using three antennas 101 to 103 is given in the third embodiment, the number of antennas is not limited to three, and two or four or more antennas may also be used.

As described above, according to the third embodiment of the present technology, it is possible to control radio wave directionality more elaborately by using the plurality of antennas 101 to 103.

It should be noted that the above embodiments illustrate examples for realizing the present technology and that there is a correspondence between the matters in the embodiments and the matters defining the invention in the claims. Similarly, there is a correspondence between the matters defining the invention in the claims and the matters in the embodiments of the present technology having the same names. It should be noted, however, that the present technology is not limited to the embodiments and can be realized by modifying the embodiments in various ways without departing from the gist of the present technology.

Also, processing steps described in the above embodiments may be regarded as a method having a series of these steps, a program for causing a computer to perform a series of these steps, or a recording medium storing the program. For example, a CD (Compact Disc), an MD (MiniDisc), a DVD (Digital Versatile Disc), a memory card, a Blu-ray (registered trademark) disc, or the like can be used as this recording medium.

It should be noted that the advantageous effects described in the present specification are merely illustrative and not restrictive, and there may be other advantageous effects.

It should be noted that the present technology can also have the following configurations.

(1)

A distance measurement apparatus including:

a radiation section disposed inside laminated glass of a vehicle's windshield and adapted to radiate radio waves and receive reflected waves of the radio waves from a target; and a distance measurement information generation section connected to the radiation section and adapted to measure a distance to the target on the basis of the radio waves and the reflected waves and generate distance measurement information.

(2)

The distance measurement apparatus of feature (1) further including:

a directing section disposed inside the windshield and adapted to guide the radio waves radiated from the radiation section, toward a given direction.

(3)

The distance measurement apparatus of feature (2) further including:

a reflection section adapted to reflect the radio waves radiated from the radiation section, toward the directing section.

(4)

The distance measurement apparatus of any one of features (1) to (3) further including:

a transmission/reception section connected to the radiation section and adapted to modulate the radio waves and demodulate the reflected waves.

(5)

The distance measurement apparatus of feature (4), in which the transmission/reception section handles millimeter waves ranging from 1 to 10 millimeters as the radio waves and the reflected waves.

(6)

The distance measurement apparatus of feature (4), in which the transmission/reception section is disposed inside the laminated glass.

(7)

The distance measurement apparatus of any one of features (1) to (6) including:

a plurality of the radiation sections.

(8)

The distance measurement apparatus of feature (1), in which the windshield includes a first glass layer, a second glass layer, and a resin layer sandwiched between the first and second glass layers, and the radiation section is disposed between the first glass layer and the resin layer.

(9)

The distance measurement apparatus of feature (8) further including:

a directing section disposed between the second glass layer and the resin layer and adapted to guide the radio waves radiated from the radiation section, toward a given direction.

(10)

The distance measurement apparatus of feature (8) or (9) further including:

a transmission/reception section disposed between the first glass layer and the resin layer, connected to the radiation section, and adapted to modulate the radio waves and demodulate the reflected waves.

(11)

The distance measurement apparatus of any one of features (8) to (10), in which the resin layer includes polyvinyl butyral.

(12)

The distance measurement apparatus of any one of features (1) to (11), in which the windshield is disposed on a front side of the vehicle.

(13)

The distance measurement apparatus of any one of features (1) to (12), in which the windshield is disposed on a lateral side of the vehicle.

(14)

The distance measurement apparatus of any one of features (1) to (13), in which the windshield is disposed on a rear side of the vehicle.

REFERENCE SIGNS LIST

10 Vehicle
100 to 103 Antennas
110 Radiator
120 Director
130 Reflector
190 Feeder
200 Millimeter-wave chip
210 Transmission section
220 Reception section
290 Electrical wiring
300 Windshield
301 Front windshield
302 Side windshield
303 Rear windshield
310, 330 Glass layers
320 Resin layer
510 Distance measurement information generation section
590 Vehicle-mounted network

The invention claimed is:

1. A distance measurement apparatus comprising:
a radiation section disposed inside a vehicle's windshield and adapted to radiate radio waves and receive reflected waves of the radio waves from a target; and
a distance measurement information generation section connected to the radiation section and adapted to measure a distance to the target on a basis of the radio waves and the reflected waves and generate distance measurement information, wherein
the windshield includes laminated glass including a first glass layer, a second glass layer, and a resin layer sandwiched between the first and second glass layers, and
the radiation section is disposed between the first glass layer and the resin layer.

2. The distance measurement apparatus of claim 1 further comprising:
a directing section disposed inside the windshield and adapted to guide the radio waves radiated from the radiation section, toward a given direction.

3. The distance measurement apparatus of claim 2 further comprising:
a reflection section adapted to reflect the radio waves radiated from the radiation section, toward the directing section.

4. The distance measurement apparatus of claim 1 further comprising:
a transmission/reception section connected to the radiation section and adapted to modulate the radio waves and demodulate the reflected waves.

5. The distance measurement apparatus of claim 4, wherein
the transmission/reception section handles millimeter waves ranging from 1 to 10 millimeters as the radio waves and the reflected waves.

6. The distance measurement apparatus of claim 4, wherein
the transmission/reception section is disposed inside the windshield.

7. The distance measurement apparatus of claim 1 comprising:
a plurality of the radiation sections.

8. The distance measurement apparatus of claim 1 further comprising:
a directing section disposed between the second glass layer and the resin layer and adapted to guide the radio waves radiated from the radiation section, toward a given direction.

9. The distance measurement apparatus of claim 1 further comprising:
a transmission/reception section disposed between the first glass layer and the resin layer, connected to the radiation section, and adapted to modulate the radio waves and demodulate the reflected waves.

10. The distance measurement apparatus of claim 1, wherein
the resin layer includes polyvinyl butyral.

11. The distance measurement apparatus of claim 1, wherein
the windshield is disposed on a front side of the vehicle.

12. The distance measurement apparatus of claim 1, wherein
the windshield is disposed on a lateral side of the vehicle.

13. The distance measurement apparatus of claim 1, wherein
the windshield is disposed on a rear side of the vehicle.

14. The distance measurement apparatus of claim 1, wherein
the windshield has a plurality of resin layers.

15. The distance measurement apparatus of claim 1, wherein
the radiation section is disposed near a rear-view mirror.

16. The distance measurement apparatus of claim 1, wherein
the radiation section is disposed where it is wiped by a wiper.

17. The distance measurement apparatus of claim 4, wherein
first wiring connecting the radiation section and the transmission/reception section is shorter than second wiring connecting the transmission/reception section and a network of the vehicle.

18. A windshield comprising:
laminated glass including a first glass layer, a second glass layer, and a resin layer sandwiched between the first and second glass layers, and
a radiation section adapted to radiate radio waves and receive reflected waves of the radio waves from a target, wherein the radiation section is disposed between the first glass layer and the resin layer.

* * * * *